Jan. 5, 1954  G. LAWSON  2,664,630
CULINARY DEVICE
Filed Jan. 12, 1951

GRACE LAWSON,
INVENTOR.

BY
ATTORNEY.

Patented Jan. 5, 1954

2,664,630

UNITED STATES PATENT OFFICE 2,664,630

CULINARY DEVICE

Grace Lawson, Los Angeles, Calif.

Application January 12, 1951, Serial No. 205,675

2 Claims. (Cl. 30—322)

This invention relates to culinary devices and more particularly is directed to such a device constructed for the specific task of handling spaghetti, noodles, and the like.

Serving spaghetti from a cooking vessel or other large container is usually an awkward inefficient procedure because of the physical character of the food product and because the food product is usually more or less immersed in a body of liquid. The smooth and slippery spaghetti is lubricated by the adhering liquid which often has an oleaginous content so that the individual strands slide over each other with nearly frictionless freedom and tend to slide in the same manner over the surfaces of serving implements.

Since the strands are commonly on the order of 24 to 30 inches long, and since a serving implement manipulated into a mass of spaghetti will engage the individual slippery strands at random intermediate points, naturally a large proportion of the lifted strands will be greatly unbalanced with one end of a strand depending from the implement to greater length than the other end. Because of such unbalance a large proportion of the lifted strands slidingly escape from the implement. In fact most of the initially engaged mass of spaghetti will fall away from the usual serving implement such as a large kitchen fork or spoon.

It is clearly desirable to provide a device that will effectively retain the lifted mass of spaghetti so that the device may be relied upon to serve a predetermined or at least an approximately predetermined quantity in a single manipulation. By dimensioning such a device for picking up a serving of a given size and by using ordinary care to manipulate it in a consistent manner, it may be used to dispense a large number of uniform servings in a public eating place, each tine with a single hand movement that speeds up operation in a busy commercial kitchen.

In providing a device for this purpose the present invention meets the problem of how to engage and effectively retain a mass of spaghetti in the required manner without rupturing, severing, or otherwise damaging the soft, vulnerable material. Such damage to spoil the appearance of the serving tends to be caused, in the first place, by the forcible insertion of the serving device into the immersed mass of spaghetti, and, in the second place, may be caused by any device that depends upon pressure or gripping action to keep the unbalanced lifted strands from slipping off the device.

The present invention avoids damage from the first cause by providing prongs so shaped, dimensioned, and spaced from each other as to enter a mass of spaghetti with an action that gently displaces the individual strands laterally from the paths of insertion without damage to the product. In effect the individual strands yield to the multiplicity of advancing prongs by weaving themselves at random among the prongs.

This desirable action in the penetration of a mass of immersed spaghetti is obtained by using prongs that taper, preferably with a rounded taper, to ends which are of small dimension or profile relative to the thickness of a spaghetti strand and which on close inspection are found to be blunt rather than sharp. It has been ascertained on one hand that prongs having relatively thick and blunt ends tend to mash and sever the encountered spaghetti strand and on the other hand that prongs having relatively narrow, exceedingly sharp ends may tend to cut and penetrate individual strands of the spaghetti.

The second cause of damage by retaining pressure or gripping action is met in the invention by avoiding the use of any pressure or gripping elements whatsoever and depending instead on certain combined friction factors to provide a required total frictional resistance against escape of the lifted strands of spaghetti. The factors that are combined to this end in the device include: the provision of a relatively extensive supporting member with spaced upright prongs mounted thereon; the provision of minutely roughened surfaces on the supporting member and on the prongs; the use of a fibrous material for the serving device that is susceptible to continual automatic renewal of minute roughness by repeated immersion in hot liquid; and an arrangement of the prongs that causes the contacted spaghetti to divide into groups intersecting in diverse directions on the supporting surface so that the required pressure for retaining friction is provided by spaghetti superimposed on spaghetti in different directions with practically all of the unbalanced strands, except perhaps a few of the uppermost, effectively retained.

The features and advantages of the invention may be understood from the following detailed description taken with the accompanying drawings.

In the drawings, which are to be regarded as merely illustrative,

Figure 1:
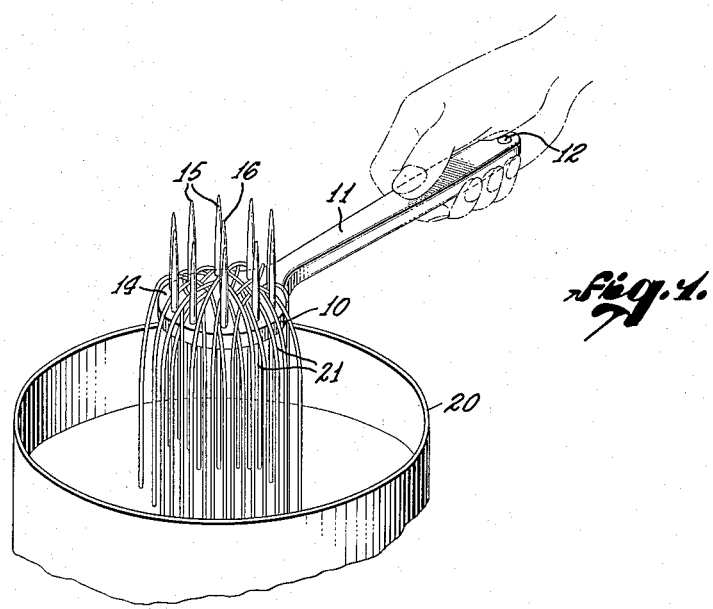
Figure 1 is a perspective view of a preferred embodiment of the culinary device in the act of lifting a serving of spaghetti from a utensil.
Figure 2:
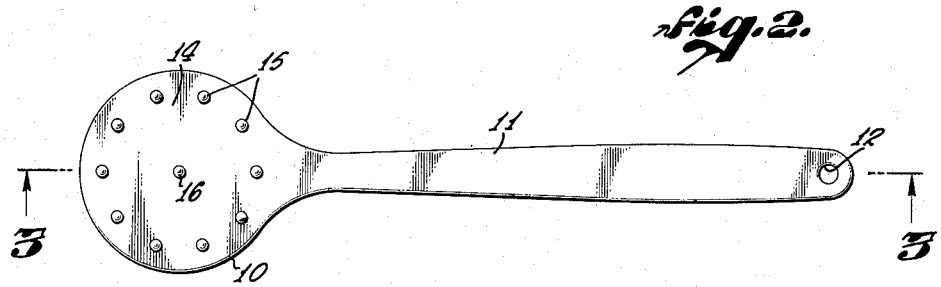
Figure 2 is a plan view of the device.

The culinary device shown in the drawings, which may be termed a spaghetti server, has a base 10 and a handle 11. In the particular construction shown, the base and handle are made of wood and are of one piece, but other materials may be used and the two parts may be separately fabricated. The handle 11 is of convenient length for the purpose and preferably has a hole 12 near its outer end for convenience in hanging the device on a hook when it is out of service.

It is contemplated that the base 10 will have a relatively large but compactly shaped supporting area 14 on which the lifted strands of spaghetti are to rest with the spaghetti ends depending from the periphery of the base as shown in Figure 1. It is further contemplated that a plurality of upright prongs 15 will be arranged in a continuous series around the supporting area 14. While the base 10 may have various configurations in plan for this purpose, it is preferred that the base be circular or disc shaped with the prongs 15 evenly spaced in a circle as shown. Other prongs may be added, for example, a prong 16 in the center of the supporting area.

It has been found that a minutely roughened surface in contact with the slippery strands of spaghetti markedly tends to keep the spaghetti from sliding along the supporting surface because minute ridges, projections, and exposed fibres engage and even penetrate the spaghetti material, any such penetration being too slight for noticeable damage. The desired degree of roughness for this effect may be obtained with a base 10 made of maple, for example, simply by leaving the surface of the wood unfinished or merely semi-finished. Thus a surface produced by a saw, preferably a saw with fine teeth, is found to work very well, but such a surface may be smoothed down to a slight degree for better appearance if desired. The prongs 15 and 16 may likewise be made of ordinary wood for the sake of minute roughness but will ordinarily be finished more smoothly since the retaining friction for a lifted mass of spaghetti is provided for the most part by the base 10.

Figure 3:
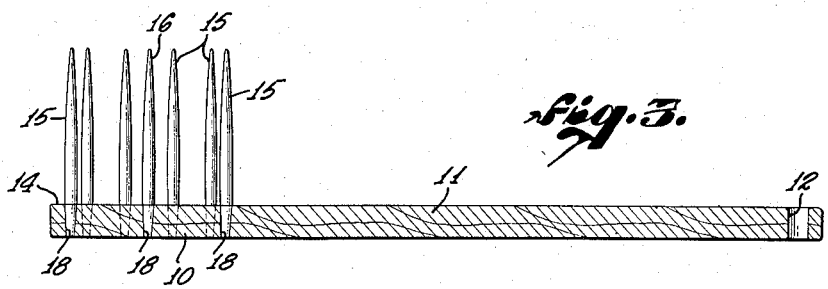
Figure 3 is a longitudinal section taken as indicated by the line 3—3 of Figure 2.

In the particular construction shown, the prongs 15 and 16 are wooden pegs having their base portions set into suitable bores 18 in the base 10. The prongs taper, preferably with a rounded taper, as shown, toward their outer ends; the ends being substantially smaller in cross section than the individual strands of spaghetti and being also slightly blunt or rounded as may be seen in Figure 3.

An advantage of using wood to fabricate the described culinary device is that the minute roughness of the wood tends to be continually renewed by the repeated immersion of the device in hot water. In fact ordinary wood even when highly polished tends in time to have the desirable degree of surface roughness. Bamboo is exceptionally advantageous in this respect and all of the prongs may be made of bamboo.

The manner in which the culinary device is used will be obvious from the foregoing description. With a single hand motion the device is dipped into the culinary vessel 20 containing the spaghetti immersed in liquid and is moved sidewise, prongs first, into the mass of spaghetti. With ordinary dexterity the device is then swept upward to the position shown in Figure 1.

It is to be noted in Figure 1 that the strands of spaghetti 21 are divided by the prongs into small groups or bundles with the strands overlying each other in various intersecting directions, the mass in effect providing its own pressure for retaining friction. The bottom layers of spaghetti are directly engaged by the minutely rough supporting surface 14 of the base, the intermediate layers are retained largely from friction arising from pressure of weight, and all of the layers make contact with various of the prongs 15 and 16 for frictional contact that tends to retain the strands.

It has been found that the described device dimensioned and proportioned as indicated by the drawing will dispense servings of substantially uniform quantity if only ordinary care is exercised to manipulate the device in the same manner for each serving. The quantity may be of any desired size, say on the order of one pound.

A feature of the device is the efficiency with which it may be used to dispense a serving when only a relatively small quantity of spaghetti remains in a relatively large volume of liquid. The device may be turned to advance the prongs 15 along the bottom of the utensil 20 with the advancing prongs at a relatively low angle to entrap the last remaining strands of spaghetti.

The efficiency of the device of the present invention is due in part to the length of the prongs 15 and 16 relative to the width of the base 10. It will be seen that the prongs are substantially equal in length and that the length of each prong is substantially equal to the width of the base. With this relationship between the prongs and base, the device will pick up the last few remaining strands held by a vessel in whch the spaghetti was cooked.

My detailed description of the preferred embodiment of the invention will suggest to those skilled in the art various modifications and departures that properly come within the spirit and scope of my appended claims.

I claim:

1. A culinary device of the character described for gathering and dispensing strands of food products, said device having: a handle; a circular wooden base integral with said handle, said base providing a minutely roughened supporting area for said strands; and a plurality of wooden prongs mounted in bores in said base, said prongs being arranged in a circle inward from the periphery of the base, each of said prongs diminishing in cross-section with a rounded taper to a relatively narrow outer end.

2. A culinary device as set forth in claim 1 in which the prongs are of a length substantially equal to the diameter of said base.

GRACE LAWSON.

References Cited in the file of this patent

UNITED STATES PATENTS

| Number | Name | Date |
|---|---|---|
| 1,043,168 | Stiles | Nov. 5, 1912 |
| 1,188,573 | Takeuchi | June 27, 1916 |
| 1,699,970 | Jacques | Jan. 22, 1929 |
| 1,854,312 | Perrenot | Apr. 19, 1932 |
| 1,959,862 | Grisko | May 22, 1934 |
| 2,398,326 | Reeves | Apr. 9, 1946 |

FOREIGN PATENTS

| Number | Country | Date |
|---|---|---|
| 524,926 | Germany | Apr. 29, 1930 |